US008565137B2

(12) United States Patent  
Song et al.

(10) Patent No.: US 8,565,137 B2  
(45) Date of Patent: Oct. 22, 2013

(54) TRACKING LOCATIONS OF MULTICAST GROUP MEMBERS WITHIN A WIRELESS COMMUNICATION SYSTEM

(75) Inventors: Bongyong Song, San Diego, CA (US); Arul Ananthanarayanan, San Diego, CA (US); Harleen Gill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 932 days.

(21) Appl. No.: 12/212,929

(22) Filed: Sep. 18, 2008

(65) Prior Publication Data

US 2009/0080359 A1 Mar. 26, 2009

Related U.S. Application Data

(60) Provisional application No. 60/974,830, filed on Sep. 24, 2007.

(51) Int. Cl.
*H04H 20/71* (2008.01)
(52) U.S. Cl.
USPC .......................... 370/312; 370/400; 455/414.2
(58) Field of Classification Search
USPC .................. 370/312, 328–329, 331, 335–338, 370/342–343, 345, 400–401, 432, 441–442, 370/465; 455/404.2, 414.2, 440, 456.1
See application file for complete search history.

(56) References Cited

U.S. PATENT DOCUMENTS

| | | | |
|---|---|---|---|
| 5,724,648 A | 3/1998 | Shaughnessy et al. | |
| 6,134,446 A | 10/2000 | Sasuta et al. | |
| 7,228,355 B2 * | 6/2007 | Dowling | 709/230 |
| 7,260,070 B1 * | 8/2007 | Smith | 370/328 |
| 7,260,396 B2 * | 8/2007 | Balachandran et al. | 455/435.1 |
| 7,483,411 B2 * | 1/2009 | Weinstein et al. | 370/338 |

(Continued)

FOREIGN PATENT DOCUMENTS

| | | |
|---|---|---|
| CN | 1838824 A | 9/2006 |
| JP | 2002094562 | 3/2002 |

(Continued)

OTHER PUBLICATIONS

"Universal Mobile Telecommunications System (UMTS); Multimedia Broadcast/Multicast Service (MBMS): Architecture and functional description (3GPP TS 23.246 version 7.3.0 Release 7); ETSI TS 123 246", ETSI Standards, LIS, Sophia Antipolis Cedex, France, vol. 3-SA2, No. V7.3.0, Jun. 1, 2007, XP014037766, ISSN: 0000-0001.

(Continued)

*Primary Examiner* — Kevin Mew
(74) *Attorney, Agent, or Firm* — James T. Hagler; Raphael Freiwirth

(57) ABSTRACT

Apparatuses and methods related to tracking locations of multicast group members within a wireless communication system are disclosed. An access terminal sends a group member report to an access network, the group member report indicating a location of the access terminal and at least one multicast group, the group member report being sent before a multicast session associated with the multicast group is initiated, determines a location update rule, the location update rule being a manner in which to report location updates of the access terminal to the access network and reports location updates of the access terminal to the access network based on the determined location update rule.

71 Claims, 8 Drawing Sheets

(56) References Cited

U.S. PATENT DOCUMENTS

| | | | |
|---|---|---|---|
| 8,112,100 B2 * | 2/2012 | Frank et al. | 455/456.4 |
| 8,391,885 B2 * | 3/2013 | Song et al. | 455/456.1 |
| 2003/0100325 A1 * | 5/2003 | Paila et al. | 455/506 |
| 2005/0043035 A1 | 2/2005 | Diesen et al. | |
| 2005/0054349 A1 * | 3/2005 | Balachandran et al. | 455/456.1 |
| 2005/0118992 A1 * | 6/2005 | Jeong et al. | 455/422.1 |
| 2005/0122938 A1 * | 6/2005 | Kim et al. | 370/335 |
| 2006/0063531 A1 | 3/2006 | Jung et al. | |
| 2006/0165107 A1 * | 7/2006 | Legallais et al. | 370/401 |
| 2006/0223510 A1 * | 10/2006 | Takeda et al. | 455/415 |
| 2007/0049314 A1 | 3/2007 | Balachandran et al. | |
| 2007/0067794 A1 * | 3/2007 | Russell et al. | 725/25 |
| 2007/0070995 A1 * | 3/2007 | Pelletier et al. | 370/389 |
| 2007/0293249 A1 * | 12/2007 | Wang | 455/466 |
| 2008/0027989 A1 * | 1/2008 | Lai et al. | 707/104.1 |
| 2008/0062923 A1 * | 3/2008 | Ponnuswamy | 370/331 |
| 2009/0080365 A1 * | 3/2009 | Song et al. | 370/312 |
| 2009/0082025 A1 * | 3/2009 | Song | 455/446 |

FOREIGN PATENT DOCUMENTS

| | | |
|---|---|---|
| JP | 2006042389 A | 2/2006 |
| JP | 2006515737 A | 6/2006 |
| JP | 2007503153 A | 2/2007 |
| WO | WO2006068451 A1 | 6/2006 |
| WO | 2008044451 A1 | 4/2008 |

OTHER PUBLICATIONS

"Digital Cellular Telecommunications System (Phase 2+); Universal Mobile Telecommunications System (UMTS); Mobile radio interface Layer 3 specification; Core network protocols; Stage 3 (3GPP TS 24.008 version 7.8.0 Release 7); ETSI TS 124 008", ETSI Standards, LIS, Sophia Antipolis Cedex, France, vol. 3-CN1, No. v7.8.0, Jun. 1, 2007, XP014037774, ISSN: 0000-0001.

"Digital Cellular Telecommunications System (Phase 2+); Universal Mobile Telecommunications System (UMTS); Location management procedures (3GPP TS 23.012 version 7.3.0 Release 7); ETSI TS 123 012", ETSI Standards, LIS, Sophia Antipolis Dedex, France, vol. 3-CN2; 3-CN4, No. V7.3.0, Jun. 1, 2007, XP014037696, ISSN: 0000-0001.

3GPP2: "C.S0054, Version 1.0, CDMA2000 High Rate Broadcast-Multicast Packet Data Air Interface Specification" Internet Citation, [Online] Feb. 2004, XP002462006, Retrieved from the internet: URL:http://www.3gpp2.org/Public_html/Specs/C.S0054-0_v1.0_021704.pdf> [retrieved on Dec. 11, 2007].

International Search Report, PCT/US2008/077538; International Searching Authority, European Patent Office; Jan. 28, 2009.

Written Opinion, PCT/US2008/077538; International Searching Authority, European Patent Office; Jan. 28, 2009.

International Preliminary Report on Patentability, PCT/US2008/077538, International Preliminary Examining Authority, European Patent Office, Oct. 14, 2009.

* cited by examiner

"Route Update"

Initial Cluster

TRACKING LOCATIONS OF MULTICAST GROUP MEMBERS WITHIN A WIRELESS COMMUNICATION SYSTEM

CLAIM OF PRIORITY UNDER 35 U.S.C. §119

The present Application for Patent claims priority to Provisional Application No. 60/974,830, entitled "METHODS OF TRACKING LOCATIONS OF MULTICAST GROUP MEMBERS WITHIN A WIRELESS COMMUNICATION SYSTEM", filed Sep. 24, 2007, which is assigned to the assignee hereof and hereby expressly incorporated by reference herein in its entirety.

BACKGROUND OF THE INVENTION

1. Field of the Invention

The invention relates to communications in a wireless telecommunication system and, more particularly to methods of tracking locations of multicast group members within the wireless communication system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the invention are directed to systems and methods of tracking locations of multicast group members within a wireless communication system. An access terminal sends a group member report to an access network, the group member report indicating a location of the access terminal and at least one multicast group, the group member report being sent before a multicast session associated with the multicast group is initiated, determines a location update rule, the location update rule being a manner in which to report location updates of the access terminal to the access network and reports location updates of the access terminal to the access network based on the determined location update rule. An access network receives the group member report and one or more subsequent location update reports from the access terminal. The access network forms a group member list including a list of access terminals, at least one multicast group associated with each of the listed access terminals, a location associated with each of the listed access terminals and a time-stamp indicating a time at which each location was last reported to the access network. The access network updates the group member list based on the location update reports and/or supplemental group member reports sent from one or more access terminal.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
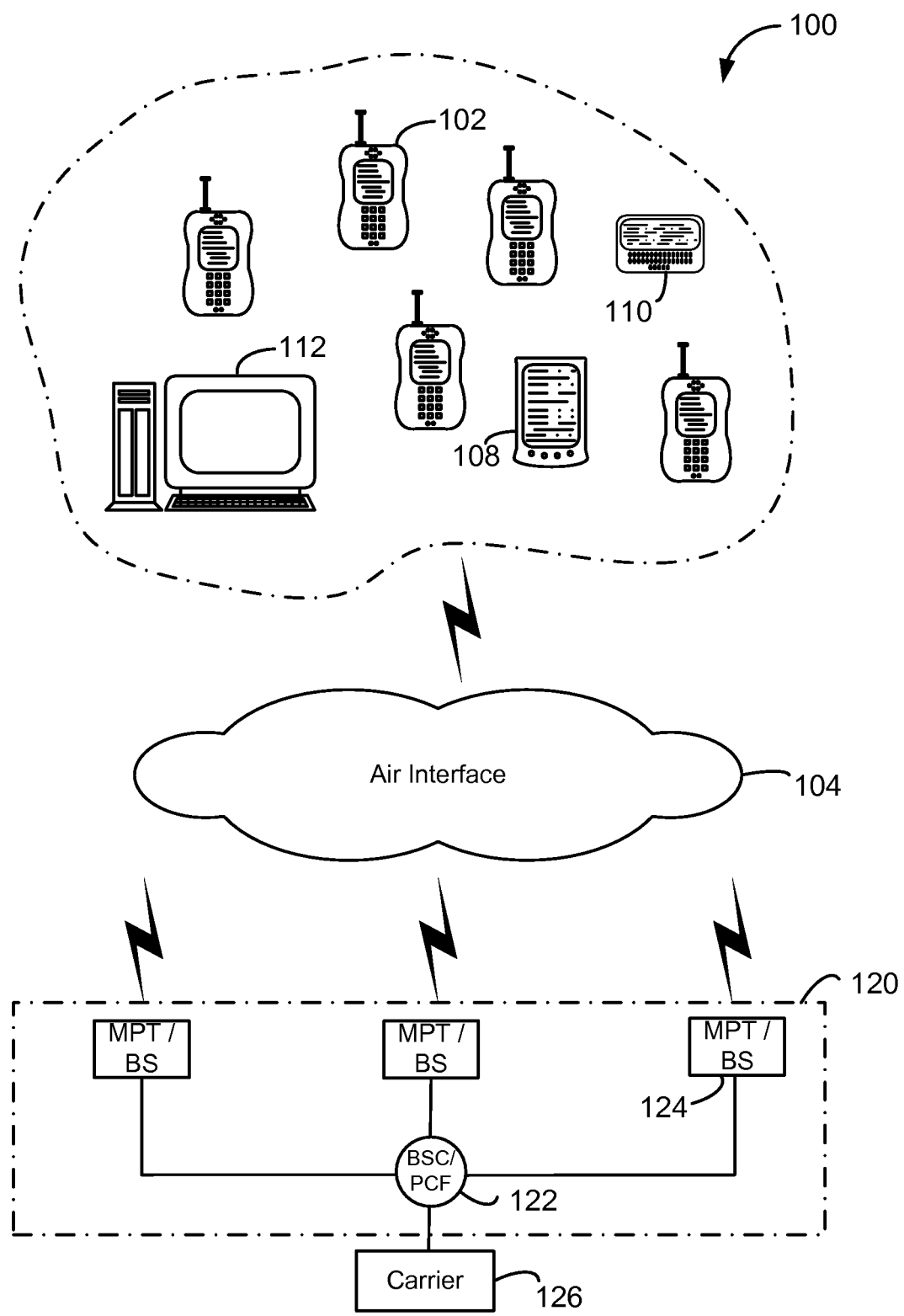
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
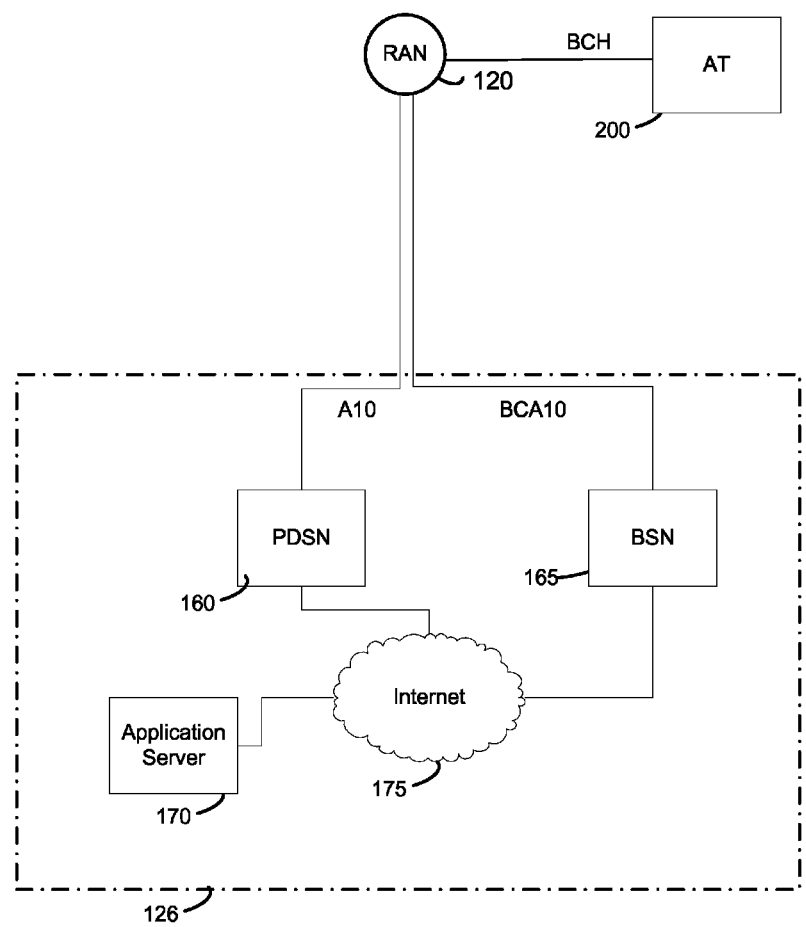
FIG. 2 illustrates the carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
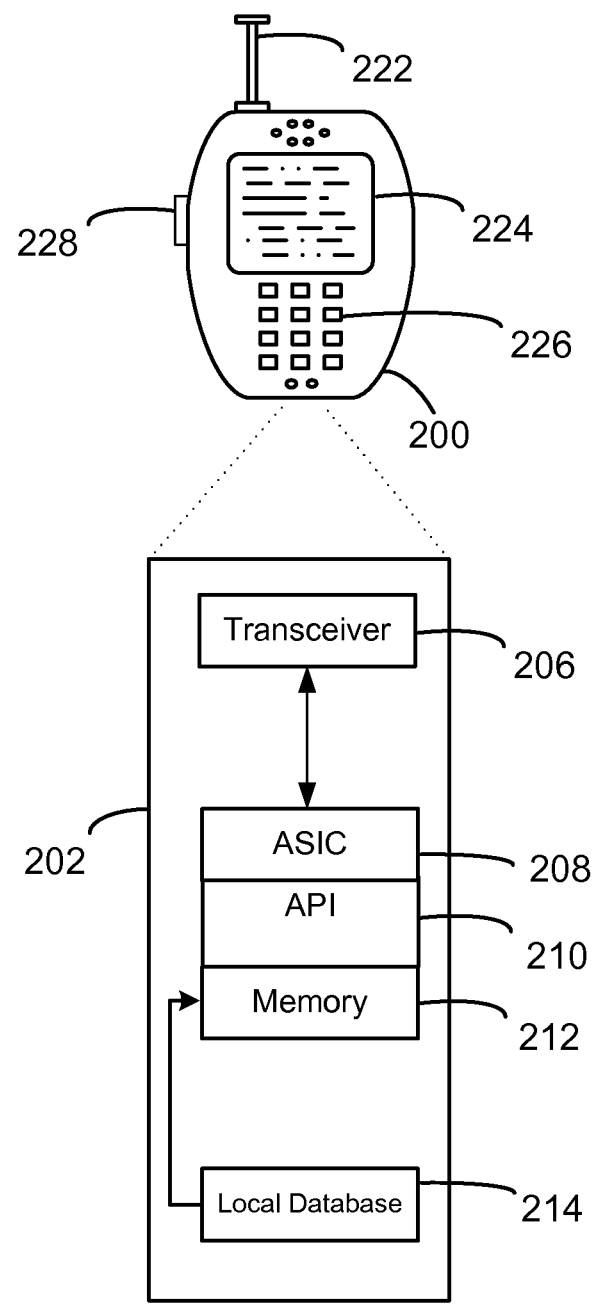
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the Background section, multicast messaging may be performed in a number of ways. In order to better understand embodiments of the present invention, a conventional multicast messaging process will be described with respect to FIGS. 4 and 5, respectively. Then, a multicast messaging process wherein a set of prospective sectors which are likely to include one or more multicast members is established before multicast session initiation will be described according to an embodiment of the present invention.

Figure 4:
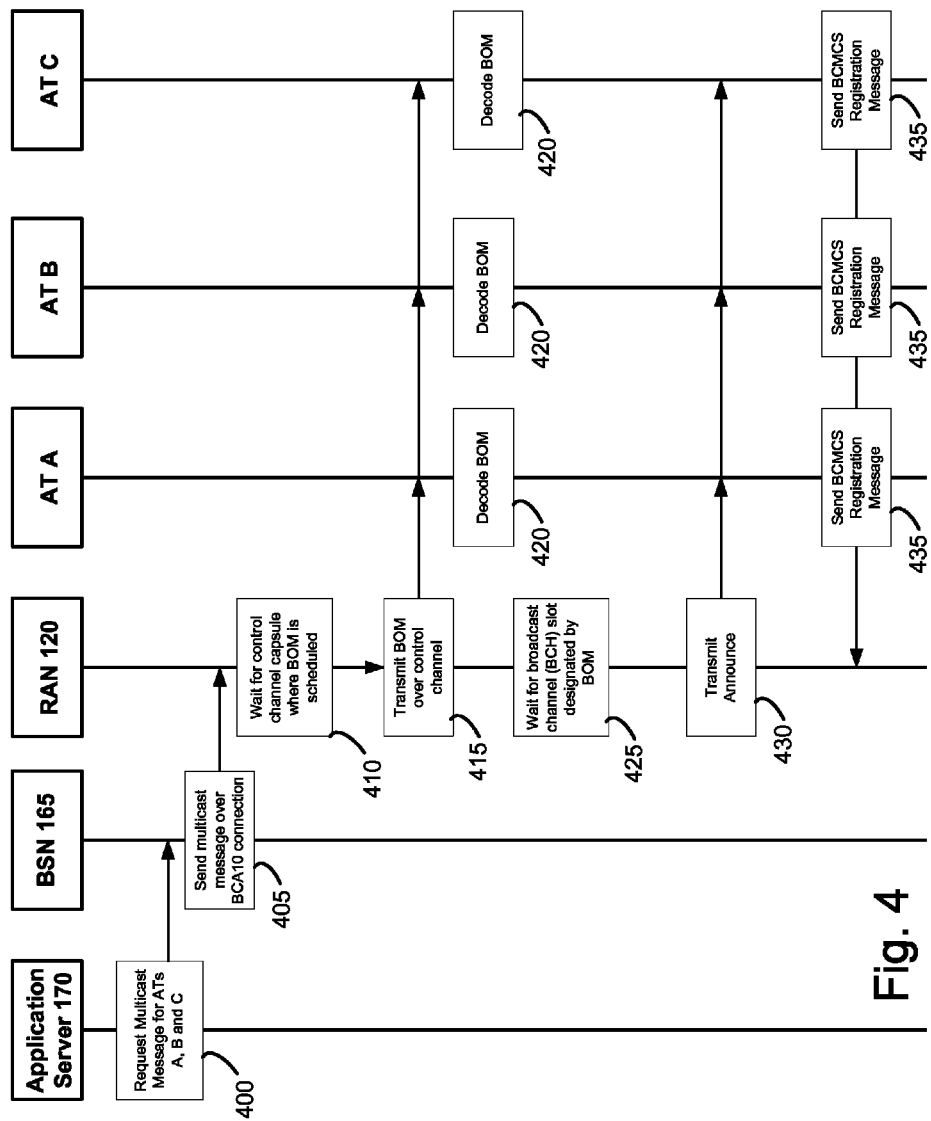
FIG. 4 illustrates a conventional multicast messaging process using a broadcast multicast service (BCMCS) framework.

FIG. 4 illustrates a conventional multicast messaging process using a broadcast multicast server (BCMCS) framework. The multicast messaging process of FIG. 4 is described below as performed within the wireless system 100 of FIGS. 1 and 2. Referring to FIG. 4, in 400, the application server 170 (or other initiator) requests a multicast message be sent to a multicast group including ATs (e.g., A, B and C). The multicast message from 400 is routed to the BSN 165. In 405, the BSN 165 forwards the multicast message over the BCA10 connection to the RAN 120. For example, the multicast message is first forwarded to the BSC/PCF 122, and the BSC/PCF 122 analyzes the multicast group members for the multicast message and forwards the multicast message to each MPT/BS 124 serving one or more multicast group members.

After receiving the forwarded multicast message, the RAN 120 waits for a next available control channel capsule in 410. The control channel referred to herein is a downlink control channel which is assigned a different frequency, coding and/or bandwidth than the broadcast channel (BCH). Generally, less bandwidth is allocated to the control channel, which is conventionally intended to include control messaging only, while more bandwidth is allocated to the broadcast channel (BCH) which is conventionally intended to include data.

Figure 5:
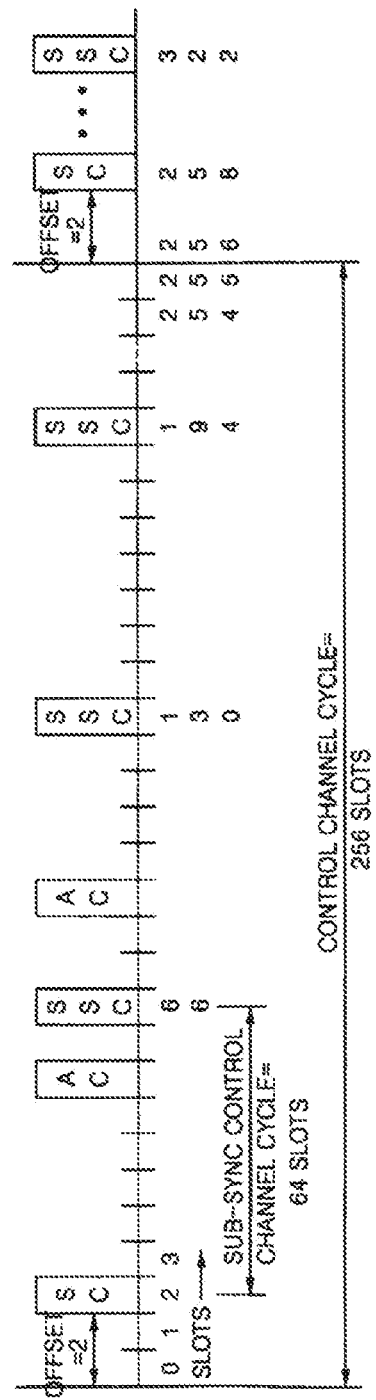
FIG. 5 illustrates a conventional cycle of a downlink control channel.

Referring to FIG. 5, each control channel cycle includes a total of 256 slots. Each control channel cycle includes a synchronous control channel capsule (SC), an asynchronous control channel capsule (AC), and a number of sub-synchronous control channels (SSCs). One SC is regularly or periodically transmitted at a given timeslot for each control channel cycle having a period of 256 slots, whereas the AC is transmitted at "random", or at non-synchronous timeslots, within the control channel cycle. The SC is first transmitted at a timeslot corresponding to "T mod 256=Offset", and then retransmitted at a timeslot corresponding to "T mod 4=Offset", where T denotes a system time and an Offset denotes a time value delayed from a fixed time, which are included in the control channel header. Each SC may include a plurality of control channel MAC layer packets, whereas each AC includes only one control channel MAC layer packet. As each MPT/BS 124 periodically transmits one or more control channel MAC layer packets, interference (e.g., inter-cell interference) may occur if each MPT/BS 124 transmits at the same time. Accordingly, a different offset is applied to the SC for each MPT/BS 124 to avoid collisions. The MPT/BS may transmit as many as three SSC capsules within one control channel period or 256 slot cycle. Each SSC typically transmits only one control channel MAC layer packet. Assuming an offset value of 2, the SSCs are transmitted at time slots 66, 130 and 194. Control channel capsules (e.g., SCs, ACs, SSCs, etc.) are generally well-known in the art within BCMCS systems, and as such a further description thereof has been omitted for the sake of brevity.

Returning back to FIG. 4, in 410, the RAN 120 may wait for either a synchronous control channel capsule (SC) (e.g., timeslot 2 in a next control channel cycle assuming an offset of 2) or, alternatively, a sub-synchronous control channel capsule (SSC) (e.g., one of timeslots 66, 130, 194 of the control channel cycle assuming an offset of 2), where the periodic BOM message is scheduled. For example, one particular control channel capsule within each control channel cycle may be reserved for a particular BOM since other applications may be attempting to access the control channel and other messages may be scheduled a delay of multiple cycles may be incurred.

In 415, after waiting for the next available SC or SSC, the RAN 120 transmits a broadcast overhead message (BOM) over the air interface to one or more multicast group members (e.g., ATs A, B, C) over a large number of sectors of the wireless communication system 100 because the locations of the multicast group members for the multicast session are not precisely known at the RAN 120. The BOM is a forward link control message defined by EV-DO standards. The BOM is used to notify each multicast group member of the BCMCS flows which are currently being carried in a sector. The BOM also provides Interlaced Multiplexed Pair (IM-Pair) information which is information regarding the forward link physical layer timeslots that should be decoded to receive the desired packet flows, and information on the number of physical layer slots per broadcast physical layer packet and physical layer rate used to transmit the flow. In 420, the RAN 120 waits a predetermined number of slots (e.g., 8 to 16 slots) for the BOM to be decoded at the target ATs. After the delay 420, the RAN 120 waits for the BCH slot designated by the decoded BOM, 425. This creates another delay, which may be further exacerbated based on the traffic on the broadcast channel (BCH). In 430, the RAN 120 transmits the announce message to each multicast group member or target AT which it is serving over the broadcast channel (BCH) on the designated BCH slot in all possible sectors. Next, in 435, each of ATs A, B and C that wish to monitor the multicast session responds to the RAN 120 with a BCMCSFlowRegistration message, as defined by 1x EV-DO standards.

As described above with respect to FIG. 4, conventional BCMCS multicast messaging typically requires each target AT or multicast group member to decode a broadcast overhead message (BOM) before a multicast message is transmitted over a broadcast channel (BCH) to the respective members of the multicast group. This creates delays both for the scheduling of the BOM, delays for the decoding, and potential subsequent delays for the scheduling the announce message. Also, the BOMs and announce messages are transmitted in all possible sectors within the wireless communication system 100. It will be appreciated, however, that multicast group members are not necessarily present within each sector. Thus, a certain number of transmissions are wasted each time a multicast session is initiated.

Embodiments of the present invention will hereinafter be described wherein access terminals "pre-register" with the RAN 120 for future multicast sessions. Thereafter, the access terminals periodically update their location and/or their group membership information such that, upon initiation of a given multicast session, the RAN 120 has at least some knowledge regarding where the multicast group members for the given multicast session are located. Thus, the RAN 120 may reduce the number of transmissions required to establish and/or maintain the given multicast session.

Figure 6:
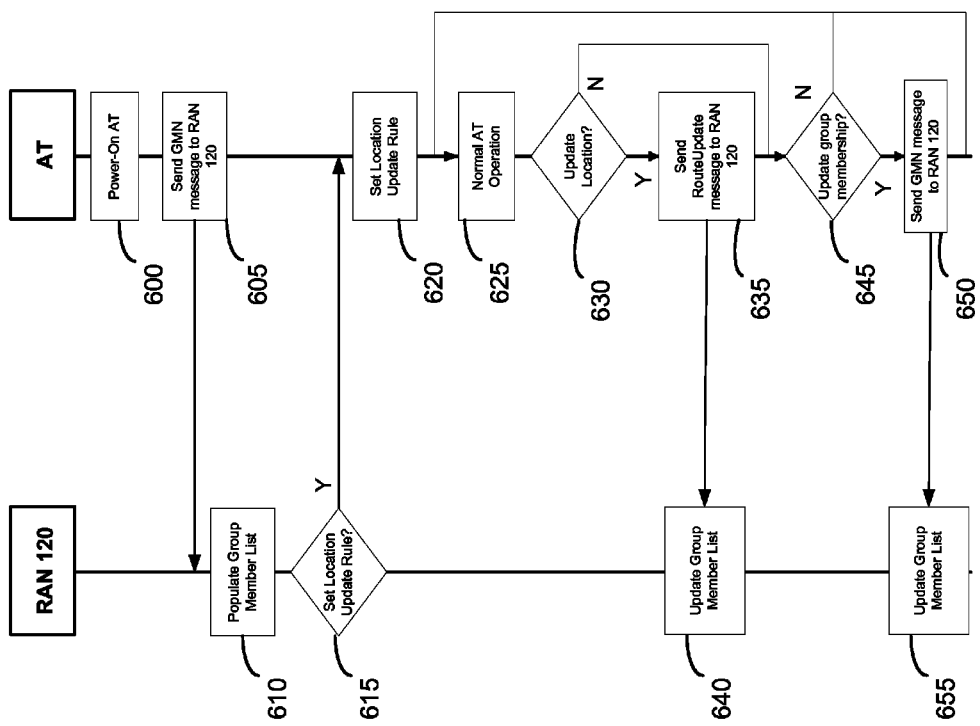
FIG. 6 illustrates group membership reporting and location update process according to an embodiment of the present invention.

FIG. 6 illustrates group membership reporting and location update process according to an embodiment of the present invention. In the embodiment of FIG. 6, in 600, a given AT desiring to belong to one or more multicast groups powers on. After the given AT powers up, the given AT sends a Group Membership Notification (GMN) message to the RAN 120 in 605 (e.g., after locating a pilot signal sent by one or more base stations within the RAN 120, and/or performing any other initial power-up procedures). The GMN message includes a list of the multicast groups to which the given AT is a current or prospective multicast group member.

In an example, the GMN message may be included within a standard BCMCSFlowRegistration message. The BCMCSFlowRegistration message is well-known in the art, and is defined within 1x EV-DO standards. Typically, an AT sends a BCMCSFlowRegistration message after receiving a BOM with a register set to prompt a BCMCSFlowRegistration message (e.g., a register for dynamic broadcast (RFDB) field or register for paging (RFP) field equal to 1). The BCMCSFlowRegistration message includes a list of BCMCSFlowIDs that an AT wishes to monitor. The BCMCSFlowIDs can be either dynamically assigned (e.g., by a BCMCS Controller (not shown)) or can be pre-configured. If the BCMCSFlowIDs are dynamically assigned by the BCMCS Controller, the AT can acquire the BCMCSFlowIDs via a BCMCS flow discovery process before sending the BCMCSFlowRegistration message. On the other hand, in another embodiment of the present invention, a certain block of BCMCSFlowIDs may be pre-configured to be reserved irrespective of whether a multicast session is actually active. In this example, each "reserved" BCMCSFlowID may be mapped to a respective IP Group ID (i.e., a multicast IP address and port number pair). In an example, the mapping of the "reserved" BCMCSFlowIDs is pre-configured at each multicast group member and at the RAN 120 and/or BSN 165, as discussed in greater detail within U.S. Provisional Patent Application No. 60/974,827, entitled "METHODS OF GENERATING MULTICAST FLOW IDENTIFIERS", filed on Sep. 24, 2007, assigned to the assignee hereof, and expressly incorporated by reference herein in its entirety. Accordingly, in this example, the BCMCSFlowIDs included within the GMN message of 605 may correspond to one or more of the "reserved" BCMCSFlowIDs.

In an alternative example, the GMN message may be included within a proprietary or non-standard message, such as, for example, in a StorageBLOBNotification message on the uplink. In this example, the GMN message may include a list of BCMCSFlowIDs. Alternatively, the GMN message may include a list of multicast IP addresses and port numbers for the multicast sessions being requested.

While 600 and 605 of FIG. 6 are directed to AT "power-up", in an alternative embodiment, a supplemental GMN message may be sent to the RAN 120 each time the given AT hands off (e.g., to a new base station, a new sub-net, etc.).

The RAN 120 receives the GMN message, 605, and populates a group member list in 610. Each group member list entry includes (i) a list of ATs having sent GMN messages to the RAN 120 ("AT List Field"), (ii) the associated multicast groups for each AT within the group member list ("Multicast Group Field") (e.g., stored as a BCMCS flow ID entry of a BCMCSFlowID is reported in 605, stored as a multicast IP address and port number pair if a proprietary message is reported in 605, etc.), (iii) a last-known location for each AT ("Location Field") (e.g., indicating a sector identification, a base station identification, etc.) and (iv) a time-stamp indicating a time at which the last-known location of the AT was reported ("Time-Stamp Field"). An example of a group member list entry is provided below as Table 1:

TABLE 1

| AT List Field | AT 1 |
|---|---|
| Multicast Group Field | T_Flow, U_Flow, V_Flow |
| Location Field | Sector Y |
| Time-Stamp Field | 7:06 PM EST |

Thus, as shown in the example of Table 1, the given AT is labeled as "AT 1" and the given AT is a member of multicast groups T_Flow, U_Flow and V_Flow. The last-known location of the given AT is within Sector Y of the wireless communication system 100, and the last-known location was reported at 7:06 PM Eastern Standard Time (EST).

In another example, the group member list entries may be grouped based on the multicast group field, as provided below as Table 2:

TABLE 2

| Multicast Group Field | T_Flow |
|---|---|
| AT List Field | AT 1, AT 2, AT 3, AT 4 |

Thus, as shown in the example of Table 2, ATs 1 through 4 are registered for multicast group T_Flow. The location field and time-stamp field have not been included within Table 2 for convenience of illustration, as these fields are specific to each of ATs 1 through 4.

It will be appreciated that the group member list entries provided above have been given for example purposes only, and other embodiments of the present invention may configure the group member list entry in any well-known fashion. For example, the Location Field may alternatively store a base station identifier, and not a sector identifier. In another example, the Location Field may store an identifier identifying a plurality of sectors, such as a location area (LA) identifier, where each LA corresponds to a portion of a subnet or PCF area (e.g., as defined by the RAN 120), or a multicast area (MA) identifier, where each MA corresponds to a portion of a subnet or PCF area identified by the RAN 120 solely for a multicasting purpose.

In 615, after updating the group member list based on the GMN message in 610, the RAN 120 determines whether to dynamically set a location update rule or protocol for the AT. The location update rule corresponds to the manner in which the AT schedules the transmission of RouteUpdate messages to the RAN 120. A RouteUpdate message updates Location Field and Time-Stamp Field (see above) for a particular AT. Generally, if the RAN 120 wishes to keep closer track of the locations of multicast group members for a particular multicast group, the RAN 120 may set a relatively aggressive location update rule in 615. Otherwise, if the RAN 120 wishes to reduce reverse link traffic, the RAN 120 may set a relatively conservative location update rule in 615. In another alternative example, the RAN 120 may set no location update rule, and may rely upon a default or manually entered location update rule at the given AT. Examples of location update rules are provided below.

In 620, the given AT establishes the location update rule. For example, if the RAN 120 determines not to dynamically set the location update rule in 615, a default location update rule may be established in 620. Alternatively, if the RAN 120 determines to dynamically set the location update rule in 615, the dynamically set location update rule is activated in 620. In another alternative example, the user of the given AT may manually select and enter a custom location update rule.

In an example, the location update rule may be a distance-based registration (DBR) protocol, such that the given AT sends a RouteUpdate message after traversing a given distance (e.g., based on which sector(s) the given AT has traversed, etc.). The given distance may be based on which base stations the given AT has been handed off to, which base stations the given AT has been monitoring while in an idle state, etc. The changes in location update rule in the distance-based registration protocol can be communicated to the AT via Generic Attribute Update Protocol (GAUP) in the EV-DO system. In another example, the location update rule may be to transmit a RouteUpdate message each time the given AT enters a new location area (LA), where each LA corresponds to a portion of a subnet or PCF area (e.g., as defined by the RAN 120).

In another example, the location update rule may correspond to any of a number of possible of location update strategies. For example, the location update rule may be timer-based, wherein the given AT maintains a timer with a predetermined or custom period and transmits a RouteUpdate message once for each timer period. In this example, lower timer periods corresponds to a more aggressive location update rule for maintaining more up-to-date location entries for the group member list. However, lower timer periods are also associated with higher levels of traffic on the reverse link.

After setting the location update rule in 620, the given AT resumes normal operation (e.g., enters idle mode, makes voice calls, etc.), 625. In 630, the given AT determines whether to update its location information with a RouteUpdate message based on the location update rule established in 620. If the location update rule requires a RouteUpdate message, the RouteUpdate message is sent to the RAN 120 in 635. In 640, the RAN 120 updates the group member list parameters based on the RouteUpdate message. For example, the RAN 120 updates the Location Field and Time-Stamp Field of the group member list for the given AT based on the RouteUpdate message. Otherwise, if the location update rule indicates that a RouteUpdate message need not be sent, the process advances to 645.

In 645, the given AT determines whether to update its group membership information with a supplemental GMN message. For example, if the given AT wishes to join a new multicast group, the given AT may determine to send a supplemental GMN message (i.e., including the BCMCSFlowID and/or multicast IP address and port number pair for the new multicast group). In another example, if the given AT wishes to cancel its membership to a multicast group that it has already registered for, the given AT may determine to send a supplemental GMN message (i.e., omitting the BCMCSFlowID and/or multicast IP address and port number pair for the canceled multicast group). In an example, each supplemental GMN message supersedes any previously send GMN message. If the given AT determines not to update its group membership information, the process returns to 625 and the given AT resumes normal operation. Otherwise, if the given AT determines to update its group membership information, the given AT sends the supplemental GMN message in 650.

In 655, the RAN 120 updates the group member list parameters based on the supplemental GMN message. If the supplemental GMN message requests different multicast groups than the previously sent GMN message, the Multicast Group Field, which maintains a list of multicast groups to which the given AT belongs, is updated to add the multicast groups listed in the supplemental GMN message. Alternatively, the Multicast Group Field is updated to remove the multicast groups listed in the supplemental GMN message if group removal is indicated within the GMN message. As will be appreciated, this may necessitate removing previously listed multicast groups, adding new multicast groups and/or both adding and removing certain multicast groups from the associated multicast group field for the given AT. Further, the RAN 120 updates the Location Field and Time-Stamp Field of the group member list for the given AT sending the supplemental GMN message.

In another example, if the supplemental GMN message includes no listed multicast groups, the supplemental GMN message is interpreted as a request to drop or cancel the given AT from the group member list entirely. Accordingly, if the supplemental GMN message includes no multicast groups, the RAN 120 removes each of the AT List Field, the Multicast Group Field, the Location Field and the Time-Stamp Field for the given AT.

As will be appreciated in view of the above-description of FIG. 6, at any given time, the group member list includes information regarding where multicast group members are "potentially" located before an active multicast session for the multicast group is actually initiated (e.g., "potentially" because the group member list may not necessarily be perfectly accurate).

Further, while not illustrated in FIG. 6 explicitly, the RAN 120 may periodically update the group member list on its own initiative (i.e., not in response to RouteUpdate messages and/or GMN messages received from one or more ATs). For example, if a Location Field for a particular AT becomes "stale", or exceeds an age threshold, the RAN 120 may interpret the stale Location Field as not being up-to-date, and may remove the associated AT from the group member list entirely.

Figure 7:
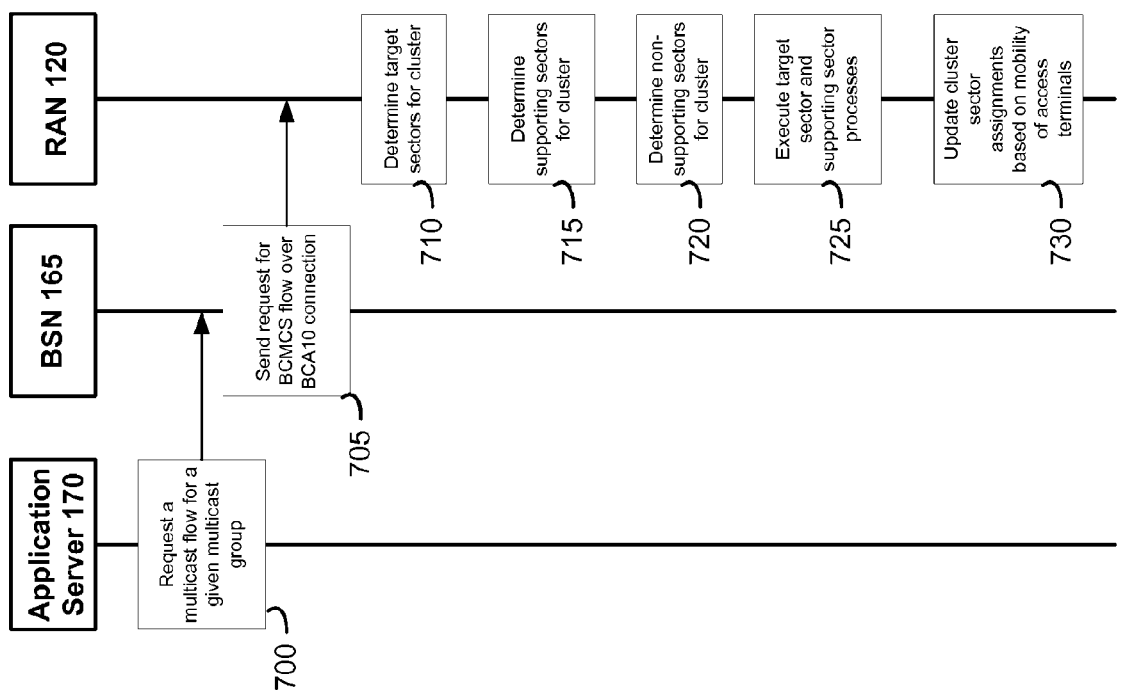
FIG. 7 illustrates a multicast messaging process according to an embodiment of the present invention.

FIG. 7 illustrates a multicast messaging process according to an embodiment of the present invention. With regard to FIG. 7, assume that the group member list maintained by the RAN 120 includes a plurality of ATs that have registered for multicast group T_Flow. Accordingly, as an example, the group member list for ATs having registered for T_Flow may include the following entries in Table 3 (below):

TABLE 3

| | AT List Field | | | | | | |
|---|---|---|---|---|---|---|---|
| | AT A | AT B | AT C | AT D | AT E | AT F | AT G |
| Multicast Group Field | T_Flow | T_Flow | T_Flow | T_Flow | T_Flow | T_Flow | T_Flow |
| Location Field | T1 | T1 | T2 | T3 | T3 | T4 | T4 |
| Time-Stamp Field (EST) | 4:05 PM | 4:08 PM | 4:07 PM | 3:03 PM | 3:23 PM | 3:38 PM | 3:44 PM |

Referring to FIG. 7, in 700, the application server 170 issues a request to initiate a multicast flow for a given multicast group. For purposes of example, assume the multicast flow corresponds to T_Flow, as in the Multicast Group Field for each of ATs A through G as in Table 3 (above). For example, the multicast flow T_Flow generated in 700 of FIG. 7 may be responsive to a given access terminal's request to speak to the given multicast group (not shown). After the application server 170 decides to accept the AT's request, the server 170 can generate a multicast flow announcement message to be sent to the group members via IP multicasting. The application server 170 forwards the multicast flow to the BSN 165 in 705, and the BSN 165 forwards the BCMCS flow over the BCA10 connection to the RAN 120, which is responsible for transmitting the multicast messages of the BCMCS flow to the multicast group members via the air interface 104 in one or more sectors, in 710.

In 710 of FIG. 7, the RAN 120 determines an initial set of target sectors for an initial "cluster". As used herein, a target sector is any sector within a wireless communication system having or "potentially" having at least one multicast group member. As used herein, a "cluster" corresponds to a set of sectors (e.g., one or more sectors) upon which the BCH carries the BCMCS flow for a particular multicast group. As will be described below in greater detail, the cluster includes both target sectors and supporting sectors for a particular multicast group or BCMCS flow.

Still referring to 710 of FIG. 7, the RAN 120 determines the initial set of target sectors based on the group member list maintained at the RAN 120 (e.g., see Table 3). Accordingly, in the example of Table 3, the initial set of target sectors may correspond to sectors T1 through T4. More generally, the initial set of target sectors may correspond to all sectors that satisfy a certain proximity metric with respect to any of sectors T1 through T4 (e.g., because the last-known location for an AT maintained at the RAN 120 within a group member list entry is not necessarily correct, but is likely to be proximate to the AT's actual current location if the time-stamp field is relatively recent).

Next, in 715 of FIG. 7, the RAN 120 determines an initial set of supporting sectors for the BCMCS flow T_Flow. In an example, the initial set of supporting sectors may be based on the initial set of target sectors. For example, the supporting sectors may correspond to any sector adjacent to one or more target sectors which itself is not a target sector. Alternatively, a supporting sector may correspond to a sector in a given proximity (e.g., a distance proximity, a signal strength proximity, etc.) to a target sector without actually being adjacent to the target sector.

In 720 of FIG. 7, the RAN 120 determines an initial set of non-supporting sectors for the BCMCS flow. The initial set of non-supporting sectors for the BCMCS flow includes any sector within the wireless system 100 which is neither a target sector as determined in 710 of FIG. 4 nor a supporting sector as determined in 715 of FIG. 7.

In 725 of FIG. 4, the RAN 120 executes target sector and supporting sector processes at the respective target and supporting sectors. Generally, each target sector and each supporting sector carries the BCMCS flow on a downlink broadcast channel BCH, and as such the RAN 120 forwards the multicast message to base stations serving target sectors T1 through T4 and the supporting sectors. However, in order to reduce excessive AT feedback, supporting sectors transmit BOMs configured to prompt AT feedback (e.g., with RFDB=1 or RFP=1) at each BOM period (e.g., to prompt feedback from an AT "wandering" into a supporting sector), whereas target sectors send BOMs to prompt AT feedback less frequently, and more frequently send BOMs to suppress AT feedback (e.g., with RFDB=0 or RFP=0) (e.g., to discourage AT registration when the target sector already carries the BCMCS flow). Non-supporting sectors do not carry the BCMCS flow T_Flow, and the RAN 120 need not forward multicast messages for T_Flow to non-supporting sectors. A more detailed discussion of target sector behavior, supporting sector behavior and non-supporting sector behavior may be found U.S. Provisional Patent Application No. 60/974,808, entitled "METHODS OF SUPPORTING MULTICAST COMMUNICATIONS ASSOCIATED WITH OVERLAPPING CLUSTERS WITHIN A WIRELESS COMMUNICATIONS NETWORK", filed on Sep. 24, 2007, assigned by the assignee hereof, and expressly incorporated by reference herein in its entirety.

Next, in 730 of FIG. 7, the RAN 120 updates the sector assignments of the cluster (e.g., adds new target/supporting sectors, removes target/supporting sectors, etc.). Again, a more detailed description of the sector assignment updates is provided within the above-referenced co-pending application. Also, while not explicitly shown in FIG. 7, it will be appreciated that, during the active multicast session, the RAN 120 continues to maintain/update the group member list based on GMN messages and RouteUpdate messages received from multicast group members.

Figure 8:
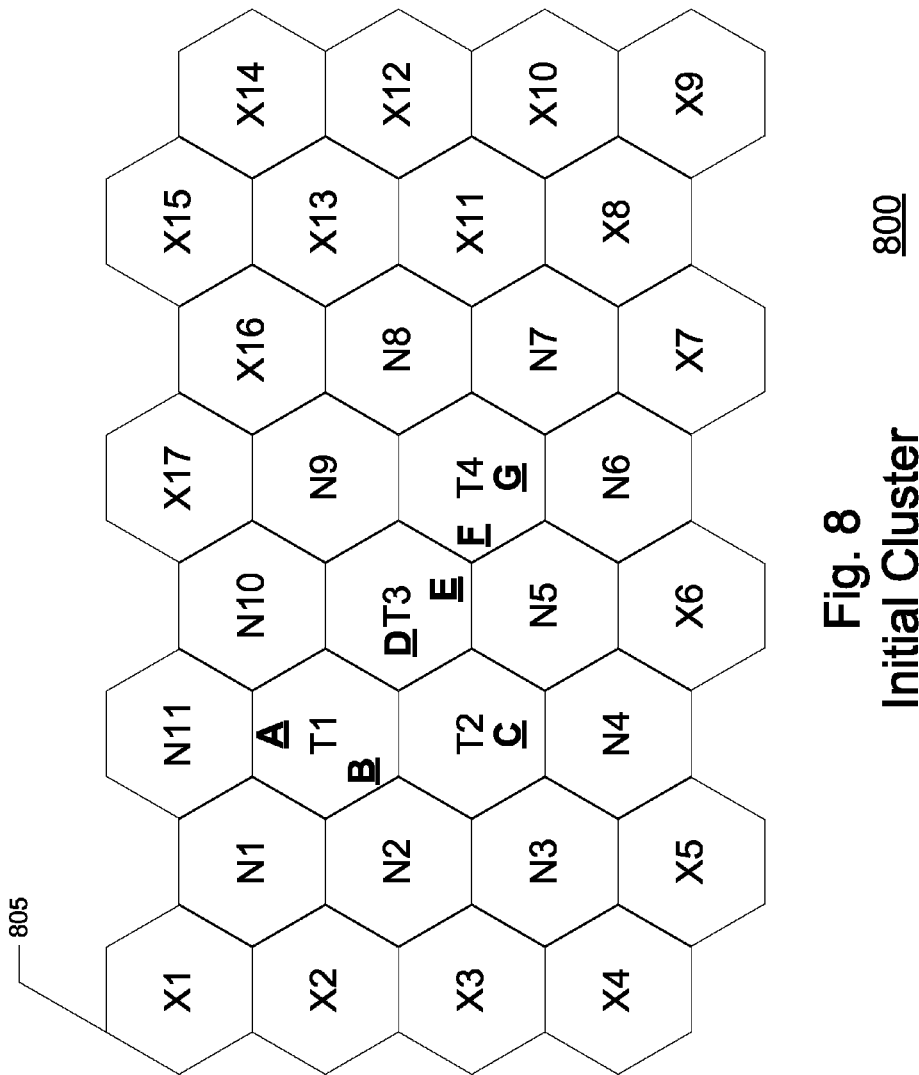
FIG. 8 illustrates a wireless communication system according to an embodiment of the present invention.

FIG. 8 illustrates a wireless communication system 800 configured based on the assumptions provided within Table 3 (above) and the process of FIG. 7. As shown in FIG. 8, the wireless communication system 800 includes a plurality of sectors 805, including target sectors T1 through T4, supporting sectors N1 through N11 and non-supporting sectors X1 through X17. As discussed above, the multicast or BCMCS flow T_Flow is announced/carried within target sectors T1 through T4 and supporting sectors N1 through N1, and the RAN 120 does not announce or send multicast messaging in support of T_Flow to base stations within non-supporting sectors. Accordingly, the level of system-wide multicast communication traffic is reduced as compared to the conventional art wherein the multicast flow T_Flow would be announced at each respective sector.

In an alternative embodiment of the present invention, as discussed above with respect to 710 of FIG. 7, the target sectors may be configured to include (i) sectors stored in the last known location field of each AT maintained in Table 3 (i.e., sectors T1 through T4) (ii) and sectors satisfying a given proximity metric with respect to (i). For example, if the given proximity metric corresponds to adjacent sectors, then the wireless communication system 800 would be modified such that the supporting sectors N1 through N11 would also be target sectors, sectors adjacent to the new set of target sectors would be supporting sectors, and so on. As another example, if the given proximity metric corresponds to all sectors within the distance from the last registered sector for conducting distance-based registration, all sectors within the distance would also be target sectors. Accordingly, it will be appreciated that the initial target sector group is not necessarily limited to the last-known locations of ATs as maintained at the RAN 120 for a given multicast group.

In another example, the group member list may be used to provide scheduling instructions, from the RAN 120 to multicast group members, that instruct the multicast group members with regard to how to respond to "interactive" multicast messages, such as announce messages, where an interactive multicast message is a multicast message that requests or requires feedback from one or more multicast group members. For example, if a large number of multicast group members are expected to be present within a particular sector, and an announce message for a multicast session is sent within the sector, a relatively large number of multicast group members may attempt to access the reverse link channel at the same time to respond to the announce message and register for the multicast session. However, with information present within the group member list, the RAN 120 can schedule a response sequence for the access terminals to respond to the announce message via an "access channel message" (ACM). For example, the RAN 120 may send the ACM along with the announce message, with the ACM designating a prioritized response order that reserves feedback slots for a number of access terminals based on the group member list. For example, the access terminal with the most recent update to its Location Field (e.g., updated via a GMN message, a RouteUpdate message, etc.) at the group member list maintained by the RAN 120 may be granted the first response slot by the ACM, the AT having the next most recent updated Location Field may be granted the second response slot by the ACM, and so on. ACMs and scheduling of interactive multicast message feedback on the reverse link are discussed in more detail within U.S. Provisional Patent Application No. 60/974, 796, entitled "METHODS OF RESPONDING TO AN INTERACTIVE MULTICAST MESSAGE WITHIN A WIRELESS COMMUNICATION SYSTEM", filed on Sep. 24, 2007, assigned by the assignee hereof, and expressly incorporated by reference herein in its entirety.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of multicasting, comprising:
    sending, from an access terminal, a group member report to a radio access network portion of a wide area access network, the group member report indicating to the radio access network portion a location of the access terminal and at least one multicast group, the group member report being sent before a multicast session associated with the at least one multicast group is initiated;
    determining a location update rule, the determined location update rule being a manner in which to report location updates of the access terminal to the access network; and
    reporting location updates of the access terminal to the access network based on the determined location update rule.

2. The method of claim 1, wherein the sending the group member report step is performed subsequent to the access terminal being powered-up.

3. The method of claim 1, wherein the sending the group member report step is performed subsequent to a handoff of the access terminal.

4. The method of claim 1, wherein the determining the location update rule step determines the location update rule based on instructions received from the access network.

5. The method of claim 1, wherein the determining the location update rule step determines the location update rule based on a default location update rule stored at the access terminal.

6. The method of claim 1, wherein the determining the location update rule step determines the location update rule based on a manual entry by a user of the access terminal.

7. The method of claim 1, wherein the location is indicated by one of a sector identifier, a base station identifier, a location area (LA) identifier and a multicast area (MA) identifier.

8. The method of claim 1, wherein the at least one multicast group is indicated by one of a broadcast multicast service (BCMCS) Flow Identifier and a multicast Internet Protocol (IP) address and port number pair.

9. The method of claim 1, wherein the sending the group member report step sends the group member report to request that the access terminal join the at least one multicast group.

10. The method of claim 1, wherein the sending the group member report step sends the group member report to request that the access terminal withdraw from the at least one multicast group.

11. The method of claim 1, wherein the determined location update rule is at least one of time-based and location-based.

12. The method of claim 11, wherein the reporting step includes:
starting a timer having a given time period at the access terminal; and
sending a location update indicating a current location of the access terminal to the access network once per each given time period of the timer.

13. The method of claim 11, wherein the determined location update rule is based on a distance-based registration (DBR) protocol.

14. The method of claim 13, wherein the reporting step includes:
sending a location update indicating a current location of the access terminal to the access network after the DBR protocol indicates the access terminal has traversed a given distance.

15. The method of claim 1, further comprising:
determining whether to change group membership information for the access terminal; and
sending, from the access terminal, a supplemental group member report to the access network if the determining whether to change group membership step determines to change the group membership information for the access terminal.

16. The method of claim 1, wherein the access terminal and an access network to which the group member report is sent are each pre-configured with the same BCMCSFlowID for the at least one multicast group.

17. The method of claim 16, wherein the pre-configured BCMCSFlowID is determined based on a multicast IP address and port designation number for the at least one multicast group.

18. A method of multicasting, comprising:
receiving a group member report from an access terminal, the group member report indicating a location of the access terminal and at least one multicast group, the group member report being sent before a multicast session associated with the at least one multicast group is initiated; and
receiving at least one location update report at an access network from the access terminal, each received location update report indicating a given location of the access terminal,
wherein the access terminal and the access network are each pre-configured with the same reserved session identifier for the multicast session before the multicast session is announced.

19. The method of claim 18, further comprising:
determining a location update rule, the determined location update rule being a manner in which to report location updates of the access terminal to the access network; and
sending the determined location update rule to the access terminal.

20. The method of claim 18, wherein the at least one location update report is received from the access terminal in accordance with the sent location update rule.

21. The method of claim 18, wherein the determined location update rule is determined after receiving the group member report from the access terminal.

22. The method of claim 18, wherein the determined location update rule is determined after receiving a supplemental group member report from the access terminal.

23. The method of claim 18, wherein the determined location update rule is configured to prompt the access terminal to send location update reports at a different rate than a rate associated with a default location update rule determined at the access terminal.

24. The method of claim 18, wherein the group member report requests that the access terminal be added to the at least one multicast group.

25. The method of claim 18, wherein the group member report requests that the access terminal be withdrawn from the at least one multicast group.

26. The method of claim 18, further comprising:
forming a group member list at the access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals; and
updating the group member list based on (i) the received at least one location update report or (ii) one or more supplemental group member reports from the access terminal.

27. The method of claim 26, wherein the group member report requests that the access terminal be added to the at least one multicast group, and the updating step updates the group member list to register the access terminal for the requested at least one multicast group.

28. The method of claim 26, wherein the group member report requests that the access terminal be withdrawn from the at least one multicast group, and the updating step updates the group member list to cancel registration of the access terminal to the at least one multicast group.

29. The method of claim 18, further comprising:
updating an existing group member list at the access network based at least on the group member report, the group member list including a list of access terminals, at least one multicast group associated with each of the listed access terminals, a location associated with each of the listed access terminals and a time-stamp indicating a time at which each location was last reported to the access network from the listed access terminals.

30. The method of claim 29, wherein the group member report requests that the access terminal be added to the at least one multicast group, and the updating step updates the group member list to register the access terminal for the requested at least one multicast group.

31. The method of claim 29, wherein the group member report requests that the access terminal be withdrawn from the at least one multicast group, and the updating step updates the group member list to cancel registration of the access terminal to the at least one multicast group.

32. The method of claim 18, wherein the reserved session identifier for the multicast session corresponds to a BCMC-SFlowID for the at least one multicast group.

33. The method of claim 32, wherein the BCMCSFlowID is determined based on a multicast IP address and port designation number for the at least one multicast group.

34. A wireless communication system, comprising:
a processor configured to send, from an access terminal, a group member report to a radio access network portion of a wide area access network, the group member report indicating to the radio access network portion a location of the access terminal and at least one multicast group, the group member report being sent before a multicast session associated with the at least one multicast group is initiated;
the processor further configured to determine a location update rule, the determined location update rule being a manner in which to report location updates of the access terminal to the access network; and
the processor further configured to report the location updates of the access terminal to the access network based on the determined location update rule.

35. The wireless communication system of claim 34, wherein the processor sends the group member report to request that the access terminal join the at least one multicast group.

36. The wireless communication system of claim 34, wherein processor sends the group member report to request that the access terminal withdraw from the at least one multicast group.

37. The wireless communication system of claim 34, wherein the determined location update rule is at least one of time-based and location-based.

38. The wireless communication system of claim 37, wherein the processor is configured to report the location updates by:
starting a timer having a given time period at the access terminal; and
sending a location update indicating a current location of the access terminal to the access network once per each given time period of the timer.

39. A wireless communication system, comprising:
a processor configured to receive a group member report from an access terminal, the group member report indicating a location of the access terminal and at least one multicast group, the group member report being sent before a multicast session associated with the at least one multicast group is initiated; and
the processor further configured to receive at least one location update report at an access network from the access terminal, each received location update report indicating a given location of the access terminal,
wherein the access terminal and the access network are each pre-configured with the same reserved session identifier for the multicast session before the multicast session is announced.

40. The wireless communication system of claim 39, wherein the processor is further configured to determine a location update rule, the determined location update rule being a manner in which to report location updates of the access terminal to the access network, and
wherein the processor is configured to send the determined location update rule to the access terminal.

41. The wireless communication system of claim 39, wherein the processor is further configured to form a group member list at the access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals, and
wherein the processor is further configured to update the group member list based on (i) the received at least one location update report or (ii) one or more supplemental group member reports from the access terminal.

42. The wireless communication system of claim 39, wherein the processor is further configured to update an existing group member list at the access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals.

43. A wireless communication system, comprising:
means for sending, from an access terminal, a group member report to a radio access network portion of a wide area access network, the group member report indicating to the radio access network portion a location of the access terminal and at least one multicast group, the group member report being sent before a multicast session associated with the at least one multicast group is initiated;
means for determining a location update rule, the determined location update rule being a manner in which to report location updates of the access terminal to the access network; and
means for reporting the location updates of the access terminal to the access network based on the determined location update rule.

44. The wireless communication system of claim 43, wherein the means for sending the group member report sends the group member report to request that the access terminal join the at least one multicast group.

45. The wireless communication system of claim 43, wherein the means for sending the group member report sends the group member report to request that the access terminal withdraw from the at least one multicast group.

46. The wireless communication system of claim 43, wherein the determined location update rule is at least one of time-based and location-based.

47. The wireless communication system of claim 46, wherein the means for reporting is configured to:

start a timer having a given time period at the access terminal; and send a location update indicating a current location of the access terminal to the access network once per each given time period of the timer.

48. A wireless communication system, comprising:
means for receiving a group member report from an access terminal, the group member report indicating a location of the access terminal and at least one multicast group, the group member report being sent before a multicast session associated with the at least one multicast group is initiated; and
means for receiving at least one location update report at an access network from the access terminal, each received location update report indicating a given location of the access terminal,
wherein the access terminal and the access network are each pre-configured with the same reserved session identifier for the multicast session before the multicast session is announced.

49. The wireless communication system of claim 48, further comprising:
means for determining a location update rule, the determined location update rule being a manner in which to report location updates of the access terminal to the access network; and
means for sending the determined location update rule to the access terminal.

50. The wireless communication system of claim 48, further comprising:
means for forming a group member list at the access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals; and
means for updating the group member list based on (i) the received at least one location update report or (ii) one or more supplemental group member reports from the access terminal.

51. The wireless communication system of claim 48, further comprising:
means for updating an existing group member list at the access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals.

52. A non-transitory computer-readable medium including program code stored thereon, the program code configured to operate within a wireless communication system including a plurality of sectors, comprising:
program code to send, from an access terminal, a group member report to a radio access network portion of a wide area access network, the group member report indicating to the radio access network portion a location of the access terminal and at least one multicast group, the group member report being sent before a multicast session associated with the at least one multicast group is initiated;

program code to determine a location update rule, the determined location update rule being a manner in which to report location updates of the access terminal to the access network; and
program code to report the location updates of the access terminal to the access network based on the determined location update rule.

53. The non-transitory computer-readable medium of claim 52, wherein the program code to send the group member report sends the group member report to request that the access terminal join the at least one multicast group.

54. The non-transitory computer-readable medium of claim 52, wherein the program code to send the group member report sends the group member report to request that the access terminal withdraw from the at least one multicast group.

55. The non-transitory computer-readable medium of claim 52, wherein the determined location update rule is at least one of time-based and location-based.

56. The non-transitory computer-readable medium of claim 55, wherein the program code to report is configured to:
start a timer having a given time period at the access terminal; and
send a location update indicating a current location of the access terminal to the access network once per each given time period of the timer.

57. A non-transitory computer-readable medium including program code stored thereon, the program code configured to operate within a wireless communication system including a plurality of sectors, comprising:
program code to receive, at an access network, a group member report from an access terminal, the group member report indicating a location of the access terminal and at least one multicast group, the group member report being sent before a multicast session associated with the at least one multicast group is initiated; and
program code to receive at least one location update report an an access network from the access terminal, each received location update report indicating a given location of the access terminal,
wherein the access terminal and the access network are each pre-configured with the same reserved session identifier for the multicast session before the multicast session is announced.

58. The non-transitory computer-readable medium of claim 57, further comprising:
program code to determine a location update rule, the determined location update rule being a manner in which to report location updates of the access terminal to the access network; and
program code to send the determined location update rule to the access terminal.

59. The non-transitory computer-readable medium of claim 57, further comprising:
program code to form a group member list at an access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals; and
program code to update the group member list based on (i) the received at least one location update report or (ii) one or more supplemental group member reports from the access terminal.

60. The non-transitory computer-readable medium of claim 57, further comprising:
   program code to update an existing group member list at the access network based at least on the received group member report, the group member list including a list of access terminals, at least one multicast group associated with each of the listed access terminals, a location associated with each of the listed access terminals and a time-stamp indicating a time at which each location was last reported to the access network from the listed access terminals.

61. The method of claim 1, further comprising:
   receiving an announcement associated with initiation of the multicast session based on the reported location updates of the access terminal.

62. The method of claim 61, wherein the announcement is received based upon a most recently reported location update of the access terminal.

63. The method of claim 18, further comprising:
   initiating the multicast session based on the received at least one location update report from the access terminal.

64. The method of claim 63, wherein the initiation of the multicast session is based upon a most recently received location update report from the access terminal.

65. The method of claim 15, wherein the supplemental group member report further indicates a current location of the access terminal to the access network.

66. The wireless communication system of claim 34, wherein the processor is further configured to:
   determine whether to change group membership information for the access terminal; and
   send, from the access terminal, a supplemental group member report to the access network if the determining whether to change group membership step determines to change group membership information for the access terminal.

67. The wireless communication system of claim 43, further comprising:
   means for determining whether to change group membership information for the access terminal; and
   means for sending, from the access terminal, a supplemental group member report to the access network if the determining whether to change group membership step determines to change the group membership information for the access terminal.

68. The non-transitory computer-readable medium of claim 52, further comprising:
   program code to determine whether to change group membership information for the access terminal; and
   program code to send, from the access terminal, a supplemental group member report to the access network if the determining whether to change group membership step determines to change the group membership information for the access terminal.

69. A method of multicasting, comprising:
   receiving, at a radio access network portion of a wide area wireless access network, a group member report from an access terminal, the group member report indicating to the radio access network portion a location of the access terminal and at least one multicast group, the group member report being sent before a multicast session associated with the at least one multicast group is initiated; and
   receiving at least one location update report at an access network from the access terminal, each received location update report indicating a given location of the access terminal.

70. The method of claim 1, wherein the group member report corresponds to a transmission with a destination address that terminates in the radio access network portion.

71. The method of claim 69, wherein the group member report corresponds to a transmission with a destination address that terminates in the radio access network portion.

\* \* \* \* \*